March 15, 1960 W. SCHAEFFER 2,928,525
HANGING CONVEYOR
Filed Aug. 1, 1955 2 Sheets-Sheet 1
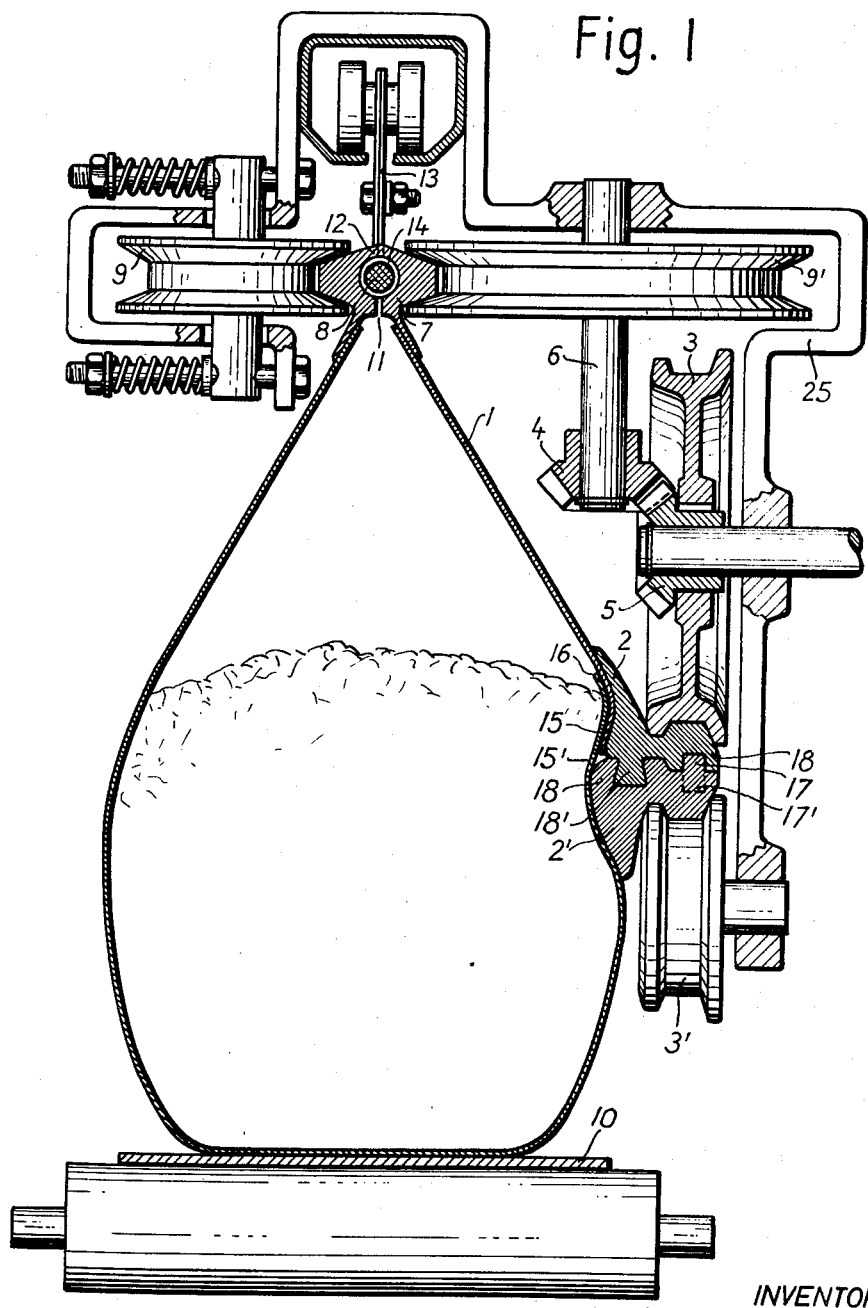
INVENTOR
Werner Schaeffer
BY March 15, 1960
W. SCHAEFFER
2,928,525
HANGING CONVEYOR
Filed Aug. 1, 1955
2 Sheets-Sheet 2
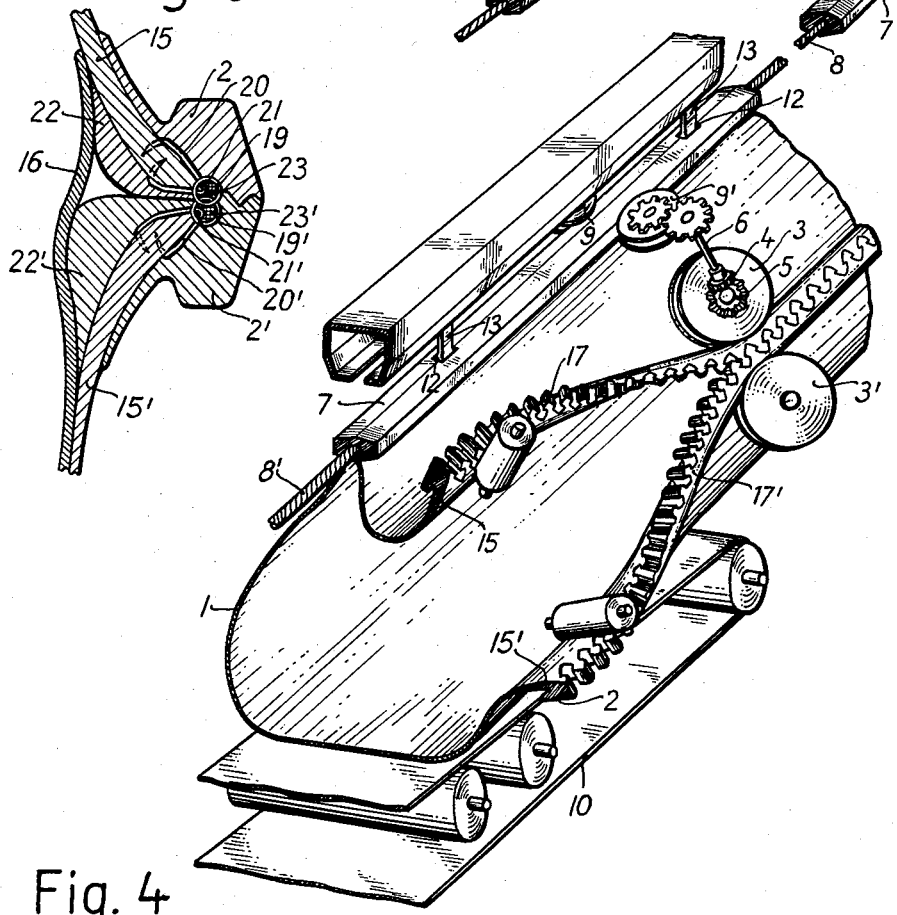
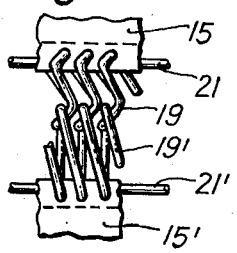
INVENTOR
Werner Schaeffer
BY

United States Patent Office 2,928,525
Patented Mar. 15, 1960

2,928,525

HANGING CONVEYOR

Werner Schaeffer, Hoverweg, Hoffnungsthal, Germany

Application August 1, 1955, Serial No. 525,691

Claims priority, application Germany August 6, 1954

3 Claims. (Cl. 198—165)

The object of the present invention is to construct as a hanging conveyor an arcuately-extending flexible tube conveyor having a pull rope on which a thin-walled flexible tube of any desired cross-section is suspended for the conveyance of bulk material, hangers being used which engage with the pull rope at intervals and which have trollies running over stationary tracks or bearing ropes, while a preferably lateral closing strip is provided which is independent of the pull rope and which is not subjected to tensile forces or to forces produced at closure and opening. According to the present invention, in a hanging conveyor having a flexible tube, the pull rope is embedded in a rubber bead and closure flaps are arranged separately at the side, or at the bottom, and are driven in the direction of an opening and/or of a closure preferably through the agency of closing and opening rolls, in order that the internal resistance of the closure means may be overcome at closure and, if desired, at opening.

The closure strip is advantageously arranged laterally, and the flexible tube is connected to the pull rope by a one-piece rubber bead which has apertures at the top through which the hangers can extend and which has a slot on the bottom for changing the pull rope. As compared with the known apparatus comprising a flexible tube with a closure head arranged above the pull rope, the invention simplifies the loading and unloading device, relieves the closure means of all tensile forces, and has the further advantage that the closure means only has to be opened once for discharging and closed again after charging. It is also advantageous to provide a flexible tube conveyor having a closure head above the pull rope with a bottom closure flap driven by the closing and opening rollers, since no consideration need be given during loading to equality of spacing of the belt edges and therefore one belt edge can remain on the pull rope and the other belt edge can be moved away laterally therefrom so that the loading profile remains free. An advantage during unloading is that the closure means above the pull rope can remain closed, with the result that the unloading station can be of very simple construction, more particularly for unloading at any desired moving station. The unloading means can be formed very simply merely, e.g., by a pair of profiled rollers which are guided along an emptying rope which can move lengthwise and which may or may not be driven and which is guided over the correspondingly formed closure strip and which holds the parts of the closure strip together before the unloading station. Special suspension devices and tracks for the unloading means are therefore not required.

The closure strip is actuated by way of the closure and opening rollers in synchronism with the speed of the conveyor, the driving force preferably being derived through an intermediate transmission from the pull rope, from a reversing disc of the conveyor or from a lower delivery-assisting belt.

In addition to the special drive, the construction of a colsure means independent of the pull rope requires other steps. Whereas in a flexible tube conveyor having a closure head above the rope, locking is effected by the pull rope in a vertical plane, that is, in the direction of application of the load, in a serrated closure means independent of the pull rope longitudinal strips must be provided in the said plane, for example in the form of through ribs and recesses. Advantageously, the latter are so constructed as not only to relieve the closure member of bearing functions but also to act as guide surfaces for bringing the closure strips together. The surfaces of such strips or of the closure belts can be so formed and arranged that the latter surfaces, when acted upon during discharge by the conveyed material, relieve the serrated closure means of load or deflect the flow of conveyed material away from the closure means. More particularly if the toothed closure means are arranged on one side, steps should be taken to prevent differential stresses occurring inside the parts of the closure strip, for example by using load-relieving slots which assist the parts of the closure member proper to slide into one another easily and without strain.

Known serrated strips made of rubber or the like can be used as the closure means. A device suitable as a serrated closure means which locks on all sides is a closure means which comprises hooks and eyes and which is known as a textile lightning fastener in helical spring form with a smooth eye-spring and a doubly cranked hook spring. The helical spring fastener can be adapted to the problem underlying the invention by being so formed as to be retainable without fabric strips and merely by virtue of a particularly advantageous shaping of its individual parts, for example in triangular form, with a closure head, merely by being introduced into correspondingly shaped pre-stressed grooves in the rubber closure strip, to be held positively and operatively therein. The hook and eye coil spring fastener can be connected to the bearing belt by means of wire hook connections, and the wire hooks themselves can be formed as a closure member with correspondingly shaped hook heads and eye heads.

Advantageously, if tensile forces are considerable, a second pull rope can be arranged outside the flexible strip fastener. The pull rope proper is therefore freed, and the rope inside the rubber bead and the rubber bead itself can be made correspondingly small and can be protected against overload during deflection.

The accompanying drawings show, by way of example, constructional forms of the invention. In the drawings:

Fig. 1 is a partly sectioned elevation of a hanging conveyor comprising a flexible tube or container;

Fig. 2 is a perspective view of a conveyor similar to that shown in Fig. 1;

Fig. 3 shows a modified closure means; and

Fig. 4 shows hook and eye type coil springs as used in the closure means of Fig. 4.

Referring to the drawings:

Figs. 1 and 2 show a hanging conveyor having a flexible tube 1 with lateral closure flaps 2, 2' which are driven, by bevel gear 4 and a gearwheel 5, and through a shaft 6, which may or may not be flexible, over a pair of profiled rollers 3, 3' which effect closure behind a delivery table or delivery belt 10. Driving power is derived from a wheel 24 (see Fig. 2) over a closure strip 7 above a pull rope 8 and a pair of friction rollers 9, 9' and is transmitted to the (flexible) shaft 6. Other known means such, for example, as V-belting can be used as the transmission means. The drive for the closure flaps may be coupled with the drive for the delivery-assisting belt 10. A bracket 25 serves to support the friction rollers 9, 9' and profiled rollers 3, 3'.

The closure strip surrounds the pull rope 8 which can be removed through a slot 11 on the inside of the flexible tube belt. In the top of the closure strip there are perforations 12 through which hangers 13 extend. Above the pull rope 8 and between the hanger clamp there is a sleeve 14 which is made of rubber or plastic, preferably of material resistant to wear, and which protects the inside of the closure strip 7 against wear so that the closure strip can be made of a material of lower quality and less resistant to wear. In addition, the provision of the sleeve 14 renders the inner profile of the closure strip 7 free from deformation, which would make subsequent processing or shaping of the closure strip necessary in the regions in which the clamps are fitted.

The closure strips 2, 2' are secured along their edges 15, 15' to the tube 1 by adhesive or by vulcanisation. On the strip edge over which discharging is effected, the closure member is protected against dirt by a skirt 16 which extends beyond the closure member and which, in its simplest form, is formed by the edge of the tube. In the closure strips 2, 2', serrated strips 17, 17' serve for longitudinal locking, and strips 18, 18' serve for transverse locking and for guiding the closure member parts together accurately.

The closure means shown in Figs. 3 and 4 uses hook and eye type coil springs, the former being designated 19, and the latter 19', and both springs being inserted in a belt edge 15 and 15', respectively, and supported by a wire 21 and 21', respectively. The springs are connected to the belt edges by means of wire hooks. As a protection against dirt, foam rubber strips 22, 22' are arranged on the inner edge, and foam rubber strips 23, 23' are arranged in the heads of the coil springs. Wire hooks 20 and 20' (see Fig. 3) connect, respectively, the coil springs 19 and 19' over the wires 20 and 21' to the belt edges 15 and 15'.

I claim:

1. Suspending belt conveyor comprising a conveying belt of substantially hoselike shape, when loaded, a bead provided on the belt and extending longitudinally thereof, a rope interiorly embedded in the bead and serving as hauling means for the belt, rail means, supporting means secured to the rope and including traveling means to run over the rail means, the belt having a longitudinally extending loading and unloading opening, a closure strip attached to each edge portion of the belt opening, the closure strips being provided with crosswise interengaging means to ensure longitudinal locking, and longitudinally interengaging complementary formations to ensure crosswise locking, and pairs of rolls arranged to engage the closure strips to interlock and unlock said strips.

2. In the conveyor according to claim 1, a support below the belt, where open for loading, with the closure strips being unlocked, the support comprising rollers and a band running over the rollers, and means to drive the band with the same speed as the bead and belt-hauling rope are operated.

3. In the conveyor according to claim 1, the belt, with the conveyor in its suspended condition, having its opening on one of its sides, the bead being secured to the belt at its top.

References Cited in the file of this patent

UNITED STATES PATENTS

| 2,013,242 | Johns | Sept. 3, 1935 |
| 2,108,488 | Johns | Feb. 15, 1938 |
| 2,548,111 | Johns et al. | Apr. 10, 1951 |

FOREIGN PATENTS

| 473,117 | Great Britain | Oct. 6, 1937 |
| 709,701 | Great Britain | June 2, 1954 |
| 728,901 | Great Britain | Apr. 27, 1955 |